No. 825,064. PATENTED JULY 3, 1906.
J. LEVEY.
VALVE FOR GAS GENERATORS.
APPLICATION FILED NOV. 27, 1905.
2 SHEETS—SHEET 2.
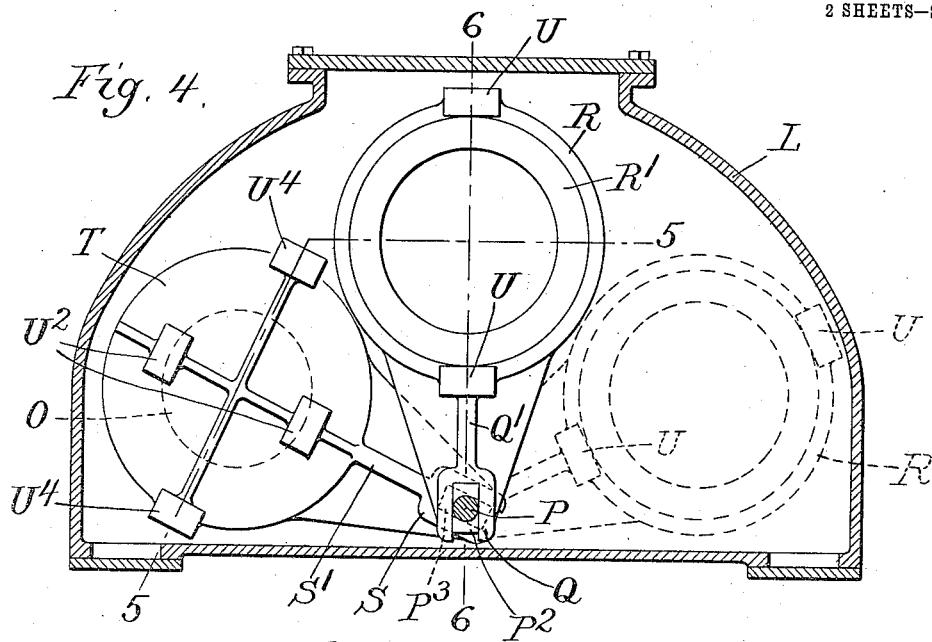
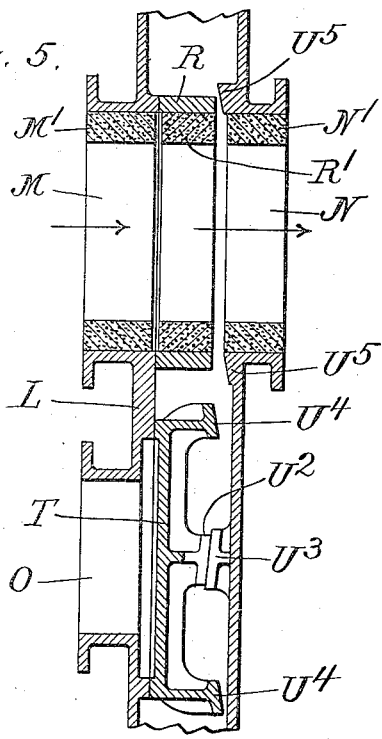
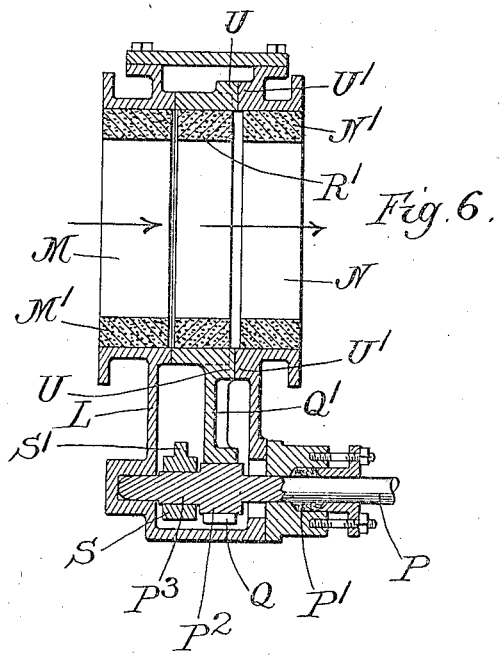
Witnesses,
Edward T. Wray
Percival H. Truman
Inventor,
John Levey,
by Parker Carter
Attorneys.

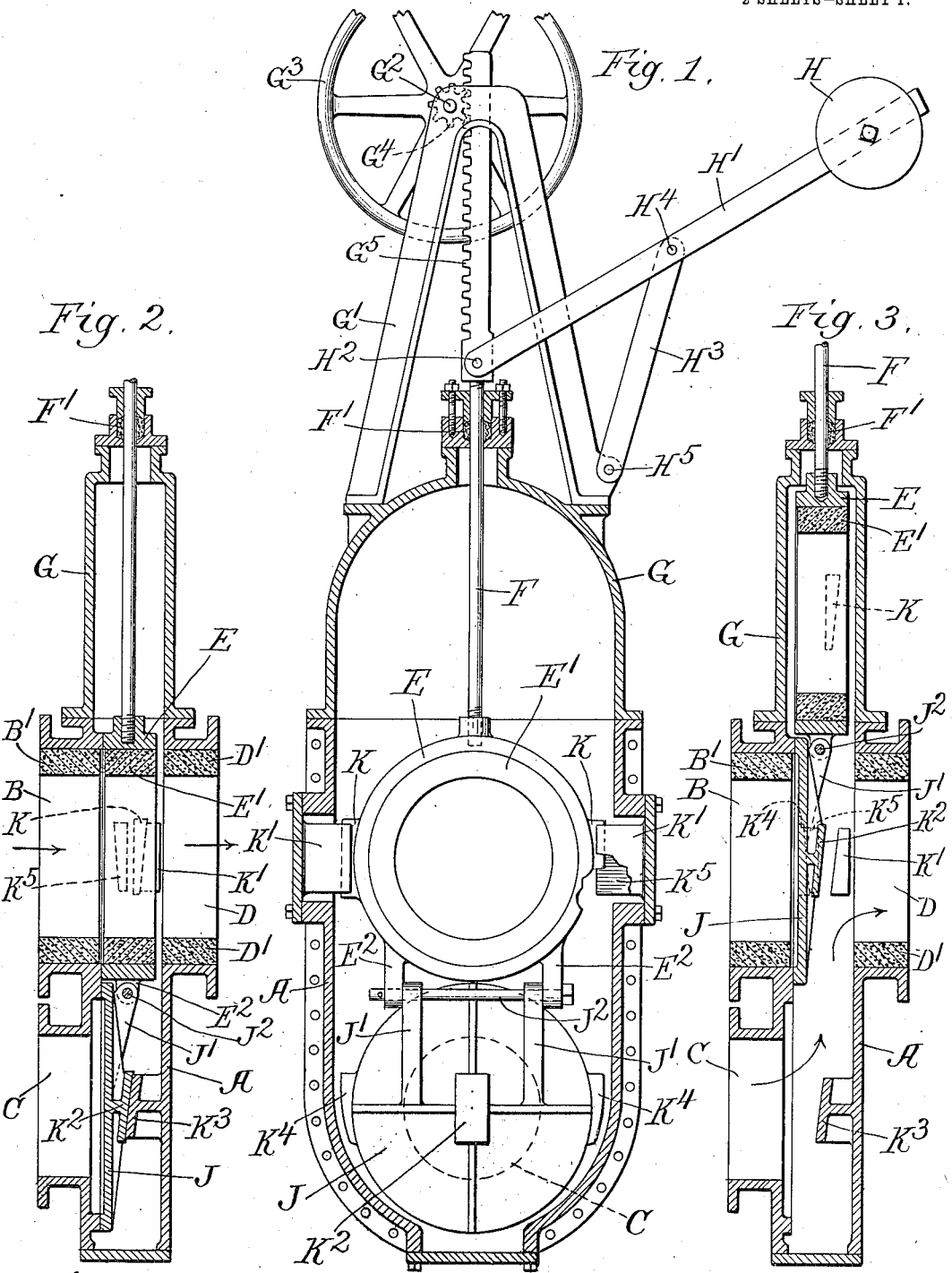

UNITED STATES PATENT OFFICE.

JOHN LEVEY, OF CHICAGO, ILLINOIS, ASSIGNOR, BY MESNE ASSIGNMENTS, TO JOHN WILLIAMSON, OF CHICAGO, ILLINOIS.

VALVE FOR GAS-GENERATORS.

No. 825,064.

Specification of Letters Patent.

Patented July 3, 1906.

Application filed November 27, 1905. Serial No. 289,274.

*To all whom it may concern:*

Be it known that I, JOHN LEVEY, a citizen of the United States, residing at Chicago, in the county of Cook and State of Illinois, have invented a certain new and useful Improvement in Valves for Gas-Generators, of which the following is a specification.

My invention relates to valves, and has for its object in particular to provide means for controlling the flow of hot or otherwise destructive vapors, gases, or liquids.

The invention is illustrated in the accompanying drawings, wherein—

Figure 1 is a vertical sectional view illustrating one form of my valve apparatus; Fig. 2, a vertical section at right angles to the plane of Fig. 1; Fig. 3, a similar section showing the parts in different positions; Fig. 4, a vertical sectional view illustrating a modification; Fig. 5, a section on line 5 5 of Fig. 4, and Fig. 6 a section on line 6 6 of Fig. 4.

Like letters of reference indicate like parts in all the drawings.

The invention consists in general of a valve device used in connection with an inlet and an outlet port, the valve device comprising two parts, one of which is apertured to form a passage-way between the two ports, the other being a closure for the same.

The invention further consists in the adaptation of the said valve device for use in connection with two inlet-ports, so that while one of the parts of the valve device is serving to form a passage-way between one of the inlets and the outlet-port the other part of the valve device is seated over the other inlet-port to close the same.

The invention further consists in providing certain of the movable and the stationary parts of the apparatus with highly-refractory linings, so as to protect the parts from destruction.

The invention further consists of the other new and improved constructions to be set out in the specification.

The apparatus of Figs. 1 to 3, inclusive, is particularly adapted for use in a plant for generating water-gas and will be described with that use in view.

A represents a valve-casing; B, the upper inlet which connects directly with the generator or retort; C, a lower inlet connected with the generator below the fire-grate, and D a common outlet leading to the carbureter.

The various connections above mentioned are not shown, as this type of gas-making apparatus is familiar, and they are referred to merely as illustrating a particular adaptation of my valve apparatus to practical use.

The ports B and D, it will be seen, form an interrupted passage-way, and as this passage-way is in the present instance designed to lead directly from the upper part of the generator into the carbureter these ports are lined with refractory material, as shown at B' B'. The opening C may or may not be so lined. As here shown it is not provided with the lining.

The passage-way from the inlet B to the outlet D is formed by a movable flue-section E, the aperture forming the flue being also preferably provided with a fireproof lining E', which, together with the fireproofing in the ports B and D, forms a continuous fireproof passage-way for the gases or the like, affording complete protection to the more or less destructible parts of the valve apparatus. As shown, E is an annulus of metal.

In the form of device shown in Figs. 1 to 3, inclusive, the annular member E is connected with a rod F, extending through a stuffing-box F' in the top of a bonnet G, formed by the upper part of the valve-casing. A standard G' on the top of the valve-casing affords a bearing for the axle $G^2$ of the hand-wheel $G^3$. Rigid with the wheel $G^3$ is the spur-gear $G^4$, which meshes with a rack $G^5$ on an extension of the rod F. In order to facilitate the movement of the flue-section E and its associated parts, I preferably provide the apparatus with a counterbalance, which is here shown as comprising a weight H at the end of a lever H', pivoted to the rod F at $H^2$, this lever being fulcrumed on the link $H^3$, which is pivoted at $H^4$ to the lever and at $H^5$ to the standard G'.

When the parts of the apparatus are in the position shown in Figs. 1 and 2, the lower inlet C is closed by a disk valve J of any desired construction, this valve being provided with lugs J' J', connected, by means of the rod $J^2$, with lugs $E^2$ $E^2$ on the flue-section E. It will be seen, therefore, that when the flue-section E is lifted up into the bonnet G the valve J is moved from the inlet C and is seated over the inlet B, thereby closing the direct passage-way between B and D and that between C and D. This latter position of the parts is shown in Fig. 3, the arrows denoting the path of the gases. In order to hold the section E and the valve J firmly in proper relations in the apparatus, I have provided a number of coacting wedges or cams arranged on the movable parts and upon the valve-casing. The annular member E when in the position between the ports B and D, is seated against the valve-casing by means of the wedges K K on the annular member, which come into contact with wedges K' K' on the sides of the valve-casing, as shown in Figs. 1 and 2. The valve J in such case is forced against the seat through the agency of the wedge $K^2$ on the valve and the wedge $K^3$ on the valve-casing. On the periphery of the valve J are the wedges $K^4$ $K^4$, and when the valve is raised to close the upper port these wedges come into contact with the wedges $K^5$ on the casing.

In Figs. 4 to 6, inclusive, I have shown a modified form of apparatus where the flue-section and the valve are connected with a rock-shaft, the two inlet-ports being arranged correspondingly. In this form of apparatus the casing is indicated by the letter L and is provided with the inlet M, preferably lined with refractory material, as shown at M', the outlet-port N with a similar lining N', and the second inlet O. A rock-shaft P extends through a stuffing-box P' into the valve-casing and has the rectangular portion $P^2$ to receive the stem Q of the rod Q', which supports the flue-section R, which, as in the other form of apparatus, may be provided with a fireproof lining, (here designated as R'.) The rock-shaft P has also the rectangular part $P^3$, over which extends the fork S of the rod S', supporting a disk valve T. The full lines in Fig. 4 show the flue-section as completing the passage-way between ports M and N, while the valve T is seated to close the port O. The dotted lines on the right of Fig. 4 show the position of the flue-section when the port M is closed by the valve. An arrangement of cams or wedges somewhat similar to that shown in Figs. 1 to 3 holds the parts in their proper relation. On the flue-section R are the wedges U, which come into contact with the wedges U' on the casing when the annular member is in the position shown in full lines. The valve T will in such case be seated by means of the wedges $U^2$ on the valve cooperating with the wedges $U^3$ on the casing. When the valve is in position to close the port M, the wedges $U^4$ $U^4$ thereon will be in contact with the wedges $U^5$ $U^5$ on the casing.

The use and operation of my device will perhaps have been indicated clearly enough by the foregoing. It will be sufficient to say that when the apparatus is used to control the flow of two streams of gas or the like, as will be the case when it is used in a gas plant, as above suggested, a clear passage-way may be formed from one flue to the other, this passage-way being lined so as to protect all the destructible parts of the valve apparatus. When the flow of gases from this source is shut off, the other port will be simultaneously opened.

I claim—

1. In valve apparatus, the combination of a casing having an inlet-port and an outlet, a movable flue-section forming a passage-way between the inlet and the outlet, a valve associated with the movable section and adapted to be interposed between such inlet and outlet when the flue-section is removed from its position between the same, means comprising coöperating members on the flue-section and the casing for holding said flue-section seated against one of said ports.

2. In valve apparatus, the combination of a casing having an inlet port and an outlet, a movable flue-section forming a passage-way between the inlet and the outlet, a lining of refractory material in said passage-way, a valve associated with the movable section and adapted to be interposed between such inlet and outlet when the flue-section is removed from its position between the same, means comprising coöperating members on the flue-section and the casing for holding said flue-section seated against one of said ports.

3. In valve apparatus, the combination of a casing having an inlet and an outlet, with a movable flue-section adapted to lie between the inlet and the outlet so as to form a substantially inclosed passage-way through the case, a valve adapted to be interposed in this passage-way to close the same, means for moving the flue-section, and associated therewith means for moving the valve and means comprising coöperating members on the casing and the flue-section for holding said flue-section seated against said inlet.

4. In valve apparatus, the combination of a casing with an inlet-port lined with refractory material, an outlet-port, a movable flue-section similarly lined, such flue-section adapted to lie between the inlet and outlet so as to form a substantially closed fireproof passage-way through the casing, a valve adapted to be interposed in said passage-way to close the same, means for moving the flue-section, and associated therewith means for moving the valve and means comprising cooperating members on the casing and the flue-section for holding said flue-section seated against said inlet.

5. In valve apparatus, the combination of a casing with an inlet-port lined with refractory material, an outlet-port, a movable flue-section similarly lined, such flue-section adapted to lie between the inlet and outlet so as to form a substantially closed fireproof passage-way through the casing, a valve adapted to be interposed in said passage-way to close the same, means for moving the flue-section, associated therewith means for moving the valve, and means for firmly seating said flue-section against one of said ports comprising wedges on the flue-section coacting with wedges on the valve-casing.

6. In valve apparatus, the combination of a casing with an inlet-port lined with refractory material, an outlet-port, a movable flue-section similarly lined, such flue-section adapted to lie between the inlet and outlet so as to form a substantially closed fireproof passage-way through the casing, a valve adapted to be interposed in said passage-way to close the same, means for moving the flue-section, associated therewith means for moving the valve, and means for firmly seating said valve against one of said ports comprising wedges on the valve coacting with wedges on the valve-casing.

7. In valve apparatus, the combination of a casing with an inlet-port lined with refractory material, an outlet-port, a movable flue-section similarly lined, such flue-section adapted to lie between the inlet and outlet so as to form a substantially closed fireproof passage-way through the casing, a valve adapted to be interposed in said passage-way to close the same, means for moving the flue-section, associated therewith means for moving the valve, and means for seating the flue-section and the valve against one of such ports comprising wedges on such flue-section and valve coacting with wedges on the valve-casing.

8. In valve apparatus, the combination of a casing having an inlet and an outlet, a movable flue-section adapted to be interposed between the same across the interior of the casing, a second inlet, a valve to close the same, means for moving said flue-section and the valve so as to close the first inlet and open the second and means for holding said flue-section and valve in their several operative positions.

9. In valve apparatus, the combination of a casing having a passage-way therethrough formed in part by a movable flue-section extending across the interior of said casing, a second passage-way in the casing communicating with the first when the flue-section is removed therefrom, a valve associated with such flue-section, and means for seating the same against the casing so as to close one or the other of such passage-ways.

10. In valve apparatus, the combination of a casing having a passage-way therethrough formed in part by a movable flue-section extending across the interior of said casing, a second passage-way in the casing communicating with the first when the flue-section is removed therefrom, a valve associated with such flue-section, and means for seating the same against the casing so as to close one or the other of such passage-ways, one of such passage-ways provided with a lining of refractory material.

11. In valve apparatus, the combination of a closed casing having an inlet and an outlet, a movable flue in said casing-section adapted to be interposed between the same so as to form a substantially inclosed continuous passage-way across the interior of the casing, a second inlet leading into the casing, a valve in said casing to close said inlet, means for moving the flue-section from its position between said first inlet and the outlet, and associated therewith means for moving the valve so as to open the second inlet and close the first.

12. In valve apparatus, the combination of a casing having an inlet, a flue-section with an aperture adapted to register with the inlet, a second inlet, a valve to close said inlet, means for removing the flue-section from the first-mentioned inlet, and associated therewith means for moving the valve so as to open the second and close the first inlet, said valve, flue-section and casing being provided with wedges which coact to hold the valve and the flue-section seated in their several operative positions.

13. In valve apparatus, the combination of a casing having an inlet, a flue-section with an aperture adapted to register with the inlet, a second inlet, a valve to close said inlet, means for removing the flue-section from the first-mentioned inlet, associated therewith means for moving the valve so as to open the second and close the first inlet, and means for seating said flue-section and valve firmly in their several operative positions.

14. In valve apparatus, the combination of a closed valve-casing having an upper and lower inlet and an outlet opposite one of the same, with a movable flue-section in said casing adapted to be interposed across the interior of the casing between the oppositely-positioned inlet and outlet, a valve attached thereto and closing the other inlet, and means for moving said flue-section and valve within the casing so as to open the last-mentioned inlet and close the other.

15. In valve apparatus, the combination of a closed casing having an upper and lower inlet and an outlet opposite the upper inlet, with a flue-section in said casing adapted to be interposed across the interior of the casing between the upper inlet and the outlet, a valve attached to said flue-section and adapted to close the lower inlet, and means for raising the flue-section and the valve within the casing so as to open the lower inlet and close the upper.

16. In valve apparatus, the combination of a closed valve-casing having two inlets and an outlet, with means for forming within such casing a substantially inclosed fireproof passage-way across the interior of the casing from one of the inlets to the outlet and for closing the other of such inlets, and means for closing the first-mentioned inlet and putting the second-mentioned inlet in communication with the outlet from said casing.

JOHN LEVEY.

Witnesses:
PERCIVAL H. TRUMAN,
LUCY A. FALKENBERG.